US006608750B2

(12) United States Patent
Cruz et al.

(10) Patent No.: US 6,608,750 B2

(45) Date of Patent: Aug. 19, 2003

(54) HANDLE-MOUNTED LIGHT CONDUIT FOR A STORAGE DEVICE CARRIER

(75) Inventors: Alexander F. Cruz, Union City, CA (US); David Youngquist, San Jose, CA (US); David R. Knaub, Portland, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 5 days.

(21) Appl. No.: 09/893,027

(22) Filed: Jun. 27, 2001

(65) Prior Publication Data

US 2003/0002249 A1 Jan. 2, 2003

(51) Int. Cl.[7] .................................................. G01F 1/16

(52) U.S. Cl. ........................ 361/685; 361/686; 361/725; 312/223.2; 362/55; 362/85; 362/341

(58) Field of Search ................................ 361/685, 725, 361/727, 802, 741, 756, 726, 686; 362/133, 559, 686, 555, 32, 551, 85; 318/471; 400/490; 200/5 A; 439/928.1

(56) References Cited

U.S. PATENT DOCUMENTS 3,759,153 A 9/1973 Aimo et al.
5,268,823 A 12/1993 Yergenson
5,515,244 A * 5/1996 Levins et al. ............... 362/551
5,530,940 A 6/1996 Ludwig, Jr. et al.
5,560,700 A 10/1996 Levens
5,654,873 A * 8/1997 Smithson et al. ........... 361/685
5,785,404 A 7/1998 Wiese
5,790,374 A 8/1998 Wong
5,815,225 A 9/1998 Nelson
5,934,782 A * 8/1999 Atkins et al. ................. 362/26
5,938,324 A 8/1999 Salmon et al.
5,943,801 A 8/1999 Wilkinson
6,045,233 A 4/2000 Iwai et al.
6,058,016 A * 5/2000 Anderson et al. ........... 361/727
6,061,244 A 5/2000 O'Sullivan et al.
6,064,568 A 5/2000 Schmitt
6,064,569 A * 5/2000 Sands et al. ................ 361/685
6,067,225 A 5/2000 Reznikov et al.
6,129,440 A 10/2000 Reynolds
6,152,578 A 11/2000 Hoffman et al.
6,231,224 B1 * 5/2001 Gamble et al. ............. 362/551
6,272,010 B1 * 8/2001 Schmitt ...................... 361/685
6,431,718 B1 * 8/2002 Gamble et al. ............... 362/85
6,473,300 B1 10/2002 Youngquist et al.

FOREIGN PATENT DOCUMENTS

EP 0965992 12/1999
WO 9600938 6/1995
WO 0193270 12/2001

OTHER PUBLICATIONS

PCT International Search Report in App. No. PCT/US 02/20726; Search mailed on Oct. 24, 2002.
PCT International Search Report in App. No. PCT/US 02/20727; Search mailed on Oct. 24, 2002.

* cited by examiner

*Primary Examiner*—Darren Schuberg
*Assistant Examiner*—Anthony Q. Edwards
(74) *Attorney, Agent, or Firm*—David W. Victor; Konrad Raynes Victor & Mann LLP

(57) ABSTRACT

A carrier assembly for a storage device includes a frame for mounting to the storage device, a handle rotatably mounted to the frame, and a light conduit in the handle, said light conduit being adapted to transmit light signals from a first end of the light conduit to a second end of the light conduit.

26 Claims, 8 Drawing Sheets

136
126
130
112
162
144
164
160

HANDLE-MOUNTED LIGHT CONDUIT FOR A STORAGE DEVICE CARRIER

FIELD OF THE INVENTION

This invention relates to a carrier assembly for a storage device.

BACKGROUND

Carriers are often attached to storage devices to facilitate insertion and removal of the storage device from a data processing system chassis. For example, a typical storage system may include a plurality of drive bays, each drive bay configured to receive a hard disk drive mounted on a disk drive carrier assembly. An exemplary disk drive carrier assembly and its operation are described in U.S. Pat. No. 6,067,225, incorporated by reference herein in its entirety. These disk drive carrier assemblies are also sometimes referred to as drive brackets or drive sleds. Storage device assemblies incorporating the drive brackets which can be removed and reinserted while the data processing system is operating are sometimes referred to as hot-swap drives.

SUMMARY

In accordance with embodiments of the present invention, a carrier assembly for a storage system is provided. The carrier assembly comprises a frame for mounting to the storage device, a handle rotatably mounted to the frame, and a light conduit in the handle, said light conduit adapted to transmit light signals from a first end of the light conduit to a second end of the light conduit.

In accordance with other embodiments of the present invention, a data processing system is provided. The data processing system comprises an enclosure, at least one device bay in the enclosure, each of the at least one device bays having a light source provided thereon, and at least one storage device assembly, each storage device assembly being removably mounted in one of the at least one device bays. Each storage device assembly comprises a storage device, and a carrier assembly mounted to the storage device. The carrier assembly comprises a frame for mounting to the storage device, a handle rotatably mounted to the frame, and a light conduit in the handle, said light conduit adapted to transmit light signals from the light source from a first end of the light conduit to a second end of the light conduit.

In accordance with yet another embodiment of the present invention, a method of operating a data processing system is provided. The method comprises mounting a storage device assembly into a storage device bay in a data processing system chassis, said storage device assembly including a storage device, a frame attached to the storage device, a handle rotatably mounted to the frame, and a light conduit provided on the handle, performing input/output (I/O) operations on the storage device provided in the storage device assembly, emitting a light signal from the device bay, said light signal indicating a status of operation for the storage device, receiving the light signal at a first end of the light conduit, and transmitting the light signal from a first end of the light conduit to a second end of the light conduit.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

While specific embodiments are described and illustrated herein, these embodiments are not intended to limit the scope of the invention, which is susceptible to various modifications and alternative forms. The use of the same reference symbols in different drawings indicates similar or identical items.

DETAILED DESCRIPTION

Figure 1:
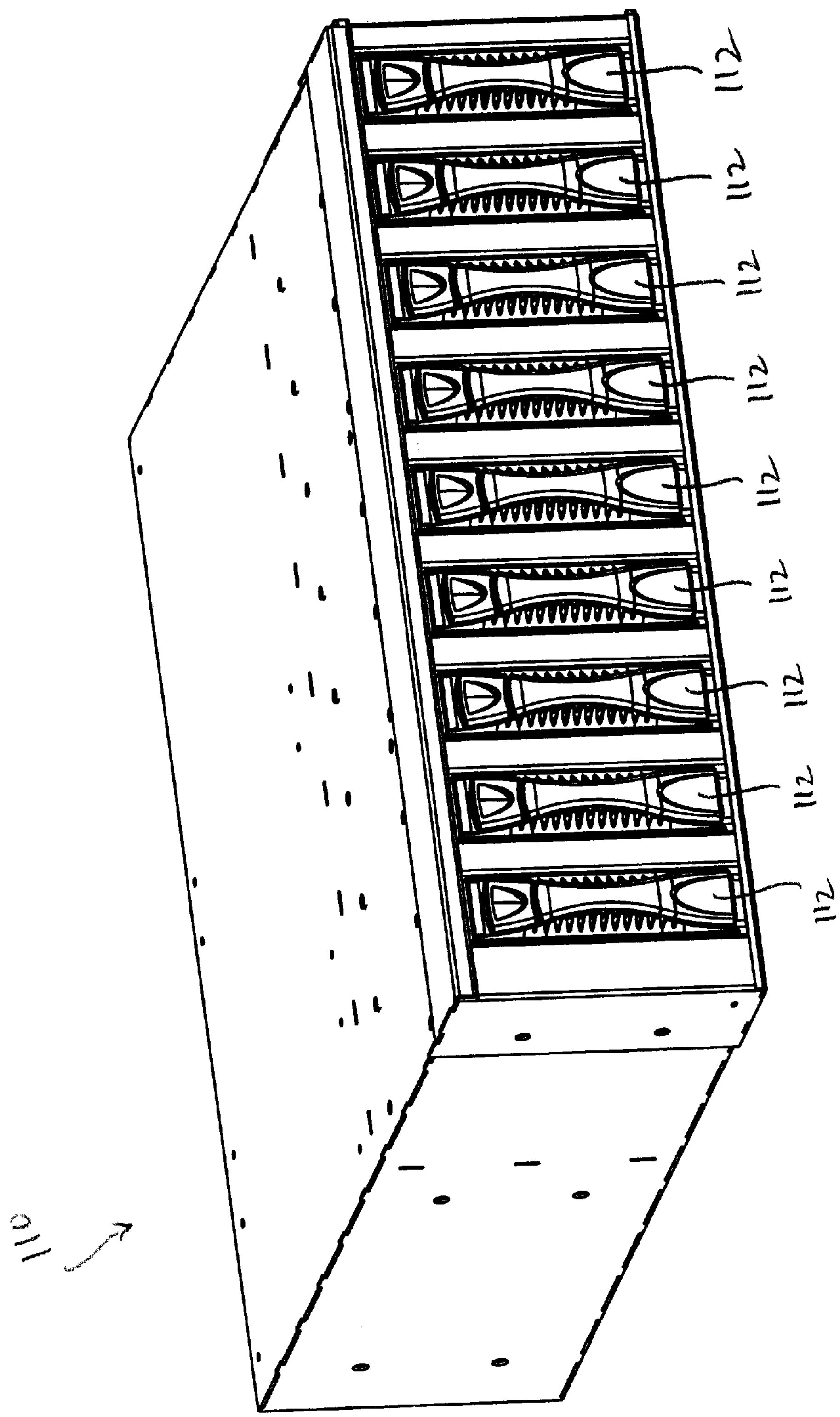
FIG. 1 shows an exemplary storage system in accordance with embodiments of the present invention.
Figure 2:
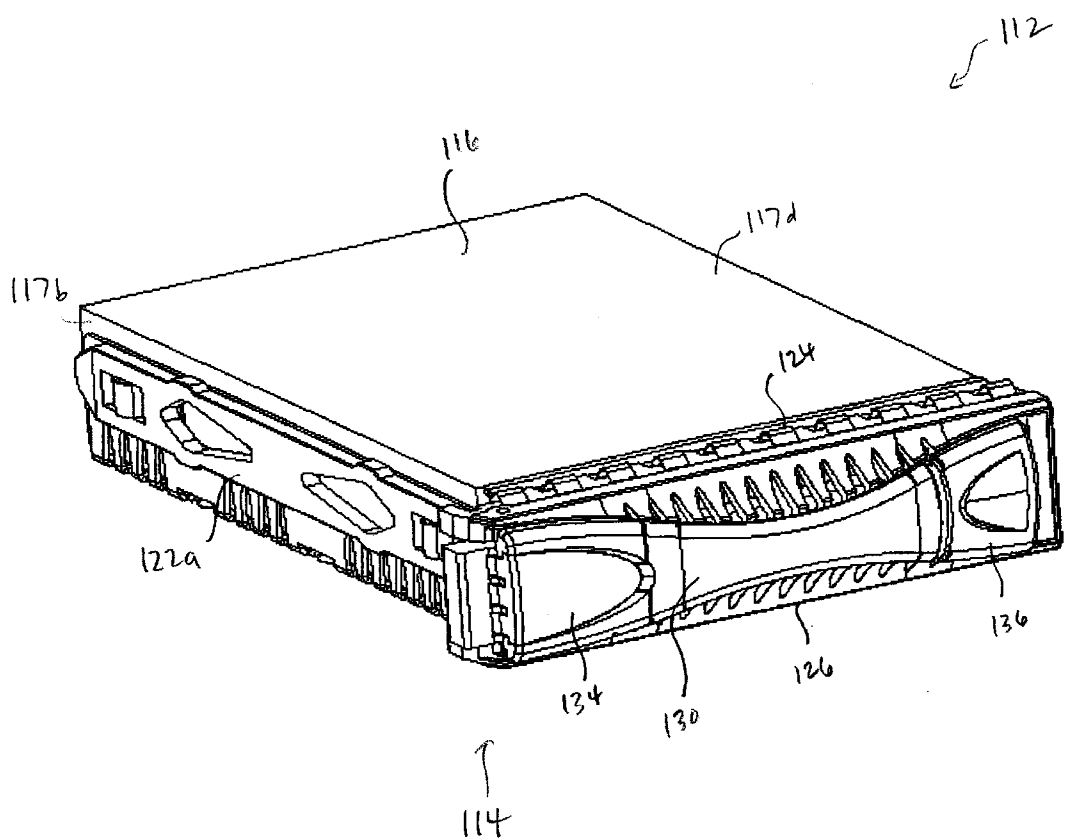
FIG. 2 shows an exemplary storage device assembly in accordance with embodiments of the present invention.
Figure 3:
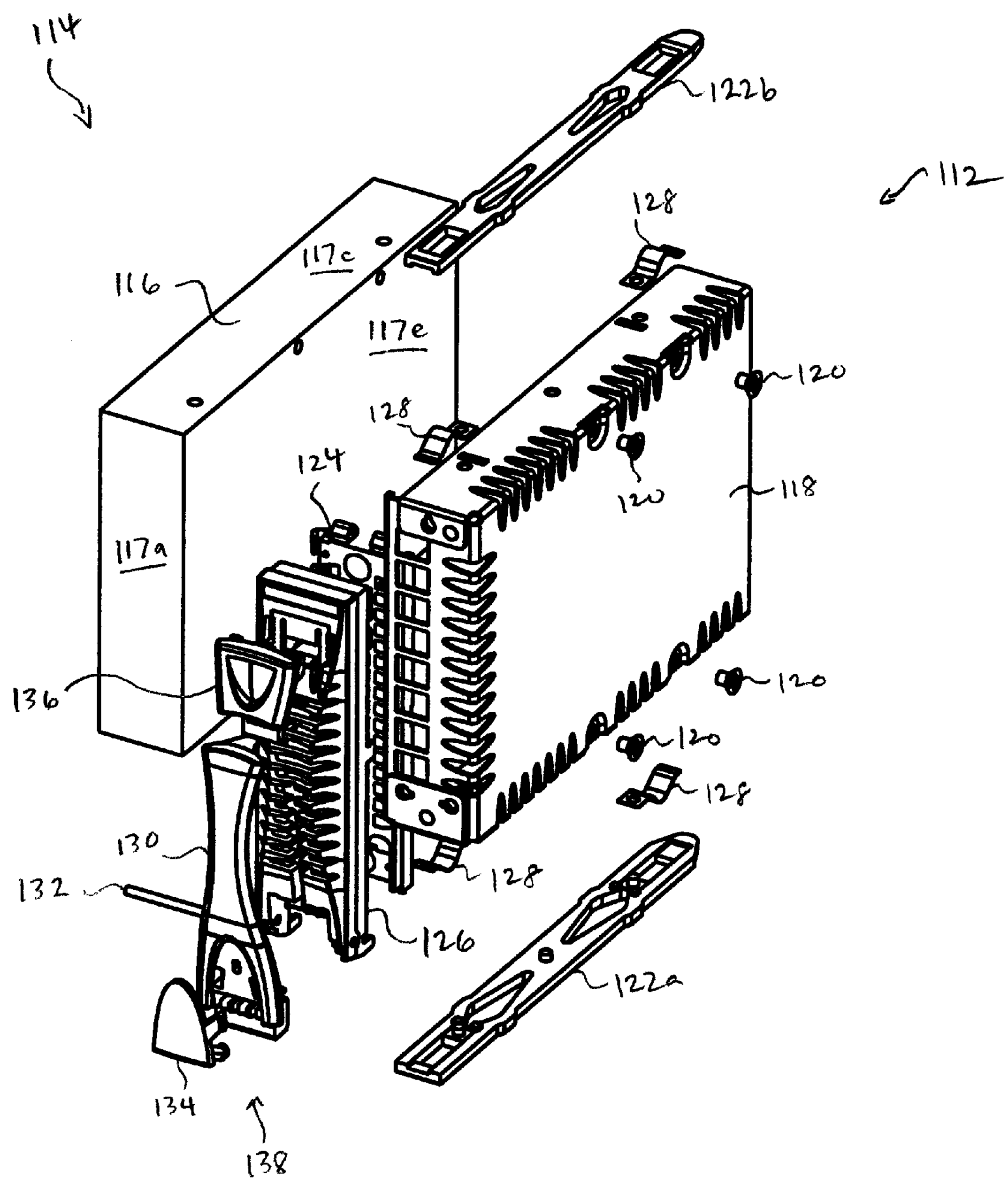
FIG. 3 shows an exploded perspective view of an exemplary storage device assembly in accordance with embodiments of the present invention.

FIG. 1 shows an exemplary data processing system 110 having a plurality of storage device assemblies 112 inserted into device bays provided in the data processing system 110. FIG. 2 shows a perspective view of a storage device assembly 112 in accordance with embodiments of the present invention. FIG. 3 shows an exploded perspective view of storage device assembly 112.

Each storage device assembly 112 includes a carrier assembly 114 mounted to a storage device 116. Storage devices 116 can be, for example, magnetic hard disk drives ("disk drives"), optical drives, magneto-optical drives, tape drives, solid state storage, or other non-volatile memory. Storage devices 116 may have a substantially rectangular shape including a front 117*a*, a back (not shown) opposite the front 117*a*, a first lateral side 117*b*, a second lateral side 117*c*, a top 117*d*, and a bottom 117*e*. It will be understood that these substantially rectangular storage devices 116 may not be perfectly rectangular and can contain variations in shape. In particular, the sides 117*a*–117*e* of a storage device 116 may not be perfectly planar and may contain ridges and protrusions to accommodate the components contained within the storage device 116. In addition, the edges and corners where the sides 117*a*–117*e* of storage device 116 intersect may be rounded or beveled. In an exemplary embodiment, the storage device assembly 112 measures 110 mm×28 mm×172 mm.

In the storage device assemblies 112 shown in the figures, the storage devices 116 are disk drives and the data processing system 110 is a storage subsystem including a disk drive array. Although FIG. 1 shows an exemplary data processing system 110 including nine storage device assemblies 112, it is understood that the number of storage device assemblies 112 in data processing system 110 may vary and is not limiting. Furthermore, although FIG. 1 shows data processing system 110 as a storage subsystem, in other embodiments data processing system 110 may be, for example, a personal computer, a computer workstation, or a computer server having one or more device bays for receiving one or more storage device assemblies 112.

Carrier assembly 114 includes a tray 118 which can attach to storage device 116 via screws 120. Carrier assembly 114 further includes first and second guides 122*a*–122*b* which attach to the sides of tray 118 adjacent the lateral sides 117*b*–117*c*, respectively, of storage device 116. Ground springs 128 may be retained between the guides 122 and the sides of tray 118. Ground springs 128 can be used to provide an electrical connection between tray 118 and a ground line provided on device bay 160 to enable improved electrical grounding for carrier assembly 114.

An electromagnetic interference (EMI) shield 124 is mounted to the back side of front grill 126, adjacent the front 117*a* of storage device 116. EMI shield 124 may be connected to a ground line on device bay 160 to enable grounding of any undesirable electromagnetic signals emanating from storage device 116. The handle 130 is rotatably mounted to front grill 126 using hinge pin 132 and includes a light conduit 134. At the opposite end of handle 130 distal from hinge pin 132 is a latching mechanism 136. EMI shield 124, front grill 126, and latching mechanism 136 together comprise the face portion 138 of carrier assembly 114.

Figure 4:
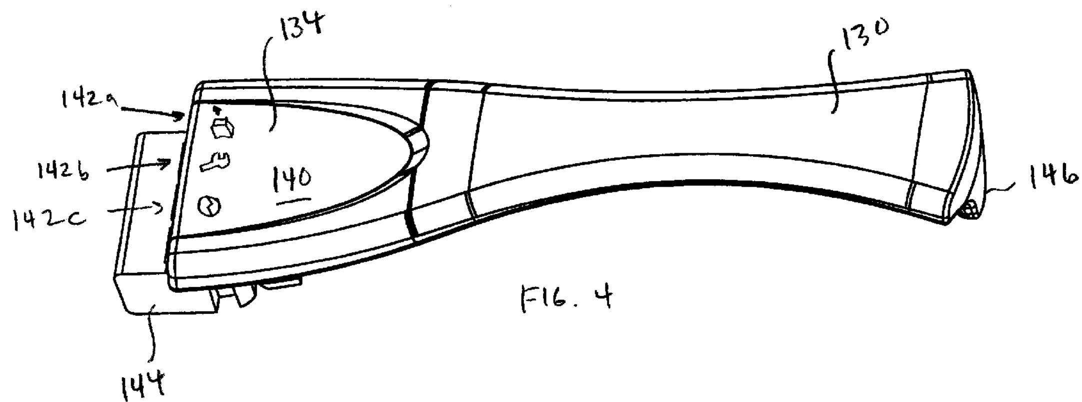
FIGS. 4–7 show perspective views of an exemplary handle for a carrier assembly in accordance with embodiments of the present invention.

FIG. 4 shows a perspective front view of handle 130 having the light conduit 134 inserted therein. The front of light conduit 134 is covered with an indicator panel 140 having a graphic of three icons 142*a*–142*c*, each icon representing a function or operation of the storage device 116. In the embodiment shown, icon 142*a* shows a blue box adjacent to a blue arrow, icon 142*b* shows an amber-colored wrench, and icon 142*c* shows a green circle having a lightning bolt inside. When icon 142*a* is illuminated, it indicates to the operator that storage device assembly 112 may be safely removed from data processing system 110. When icon 142*b* is illuminated, it indicates to the operator that there is a problem with the system. When icon 142*c* is illuminated, it indicates to the operator that storage device assembly 112 is operating properly. In some embodiments, icon 142*c* may flash to indicate I/O transmissions by storage device 116. A flange 146 is provided at one end of handle 130 for mating with latching mechanism 136. A cam portion 144 provided at an opposite end of handle 130 forms a side extension from the handle 130.

Figure 5:
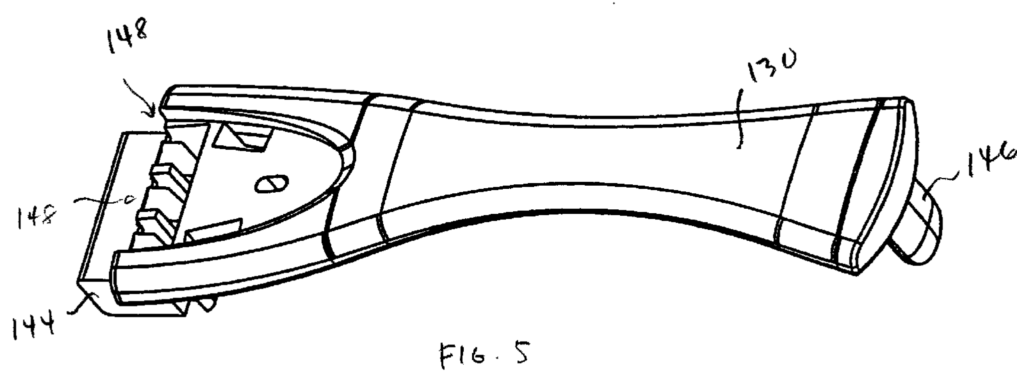
Figure 6:
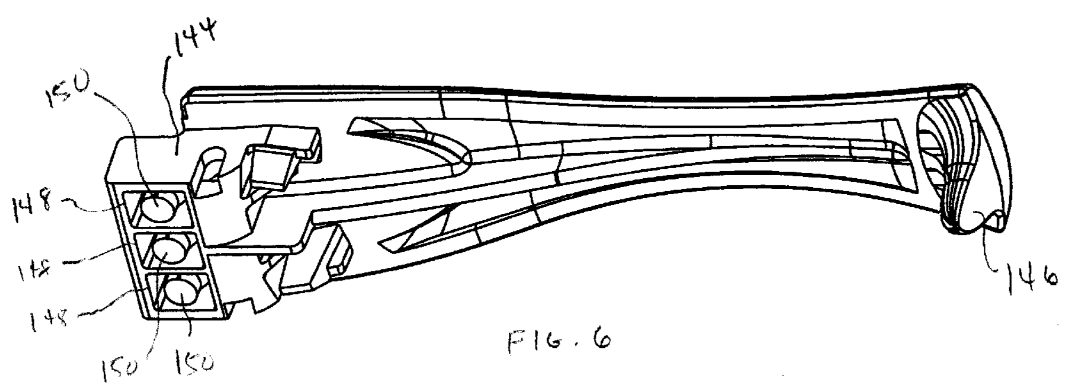
Figure 7:
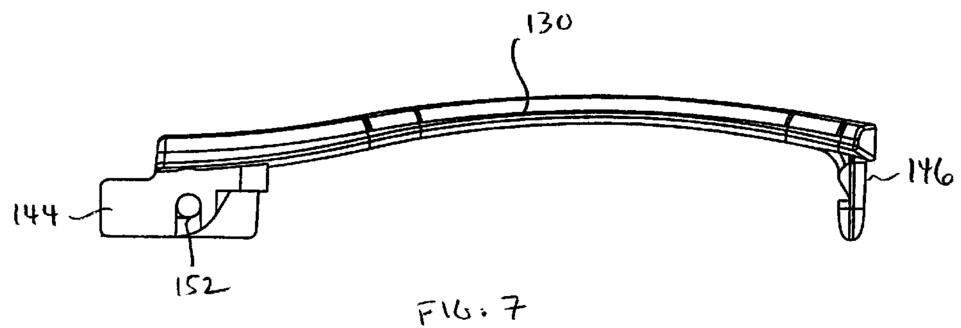

FIG. 5 shows another perspective front view of handle 130. In FIG. 5, light conduit 134 has been removed from handle 130, revealing openings 148 into which portions of light conduit 134 are received. FIG. 6 shows a rear perspective view of handle 130 with light conduit 134 inserted. The first end portions 150 of light conduit 134 can be seen within openings 148. In some embodiments, the first end portions 150 of light conduit 134 are flush with or slightly withdrawn from the surface of the cam portion 144 to prevent damage to the first end portions 150. FIG. 7 shows a top view of handle 130, revealing mounting hole 152, through which hinge pin 132 is inserted to rotatably mount handle 130 to front grill 126.

Figure 8:
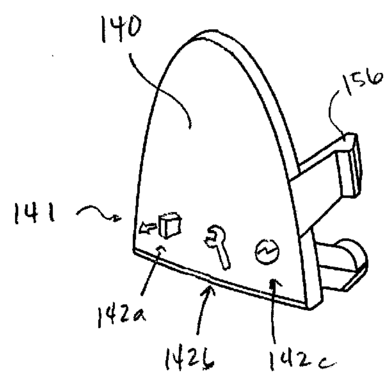
FIGS. 8–9 show front and rear perspective views of an exemplary indicator panel for a carrier assembly in accordance with embodiments of the present invention.
Figure 9:
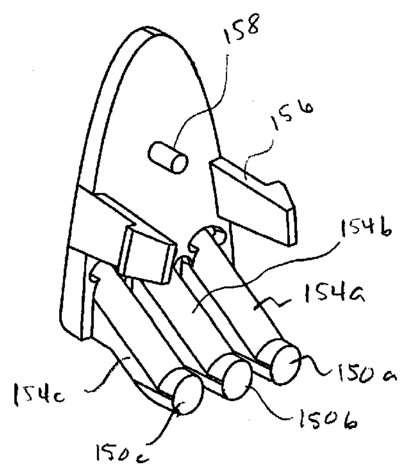

FIGS. 8 and 9 show front and back perspective views, respectively, of an exemplary light conduit 134. In FIG. 9, it can be seen that light conduit 134 includes three light channels 154*a*–154*c*, each light channel 154*a*–154*c* terminating in one of the three first ends 150*a*–150*c*, respectively. Light conduit 134 is formed of a light-transmitting material such that light signals entering first ends 150*a*–150*c* pass through light channels 154*a*–154*c* to second end 141. As shown in FIG. 8, the second end 141 is covered by the opaque indicator panel 140, which contains three translucent icons 142*a*–142*c*, through which the light signals may pass. In some embodiments, icons 142*a*–142*c* may be tinted to different colors or have different shapes. Latches 156 are used to securely mount the light conduit 134 to the handle 130 such that each light channel 154*a*–154*c* passes through one of the openings 148. A positioning pin 158 is provided to assist with proper mating of light conduit 134 with handle 130.

As shown in FIGS. 8–9, the light conduit 134 is formed of a single translucent piece of molded polycarbonate with a partially opaque indicator panel 140 covering the front portion. Although FIGS. 8 and 9 show a light conduit 134 formed of a single piece of molded polycarbonate having three light channels 154*a*–154*c* protruding from one side, in other embodiments, the light conduit 134 may be formed of separate light channels, each separate light channel being capable of transmitting light signals. The shape, material, and color of the light conduit 134 may vary in different embodiments.

Figure 10:
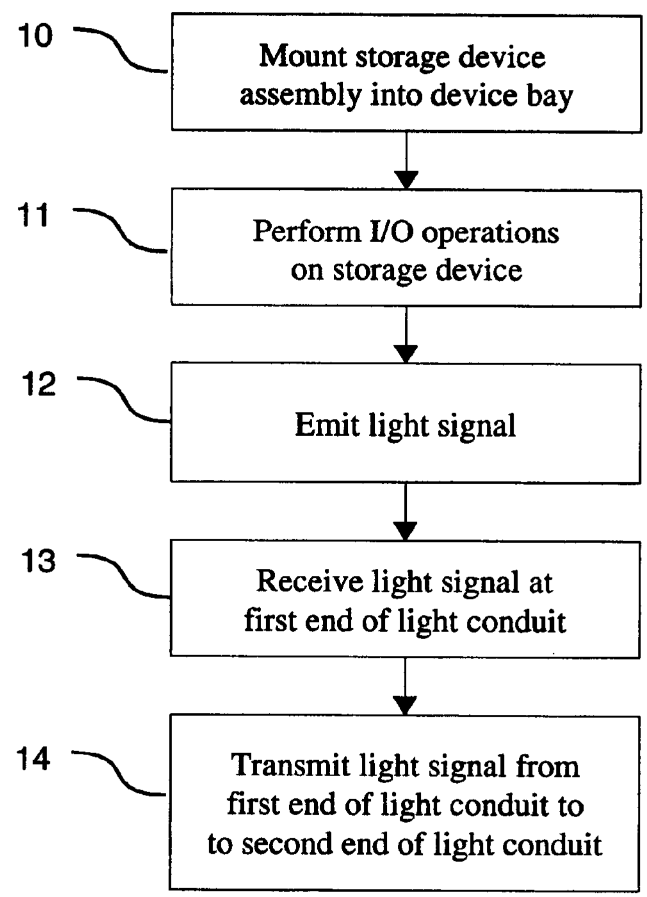
FIG. 10 is a flowchart showing a method of operating a data processing system in accordance with embodiments of the present invention.

FIG. 10 is a flowchart showing a method of operating a data processing system in accordance with embodiments of the present invention. In step 10, a storage device assembly 112 is mounted into a device bay 160. In step 11, input/output (I/O) operations are performed on the storage device 116 inside the storage device assembly 112. In step 12, a light signal indicating a status of operation for the storage device 116 is emitted. This light signal is received at a first end 150 of the light conduit 134 in step 13, and the light signal is transmitted from the first end 150 to the second end 141 of light conduit 134.

Figure 11:
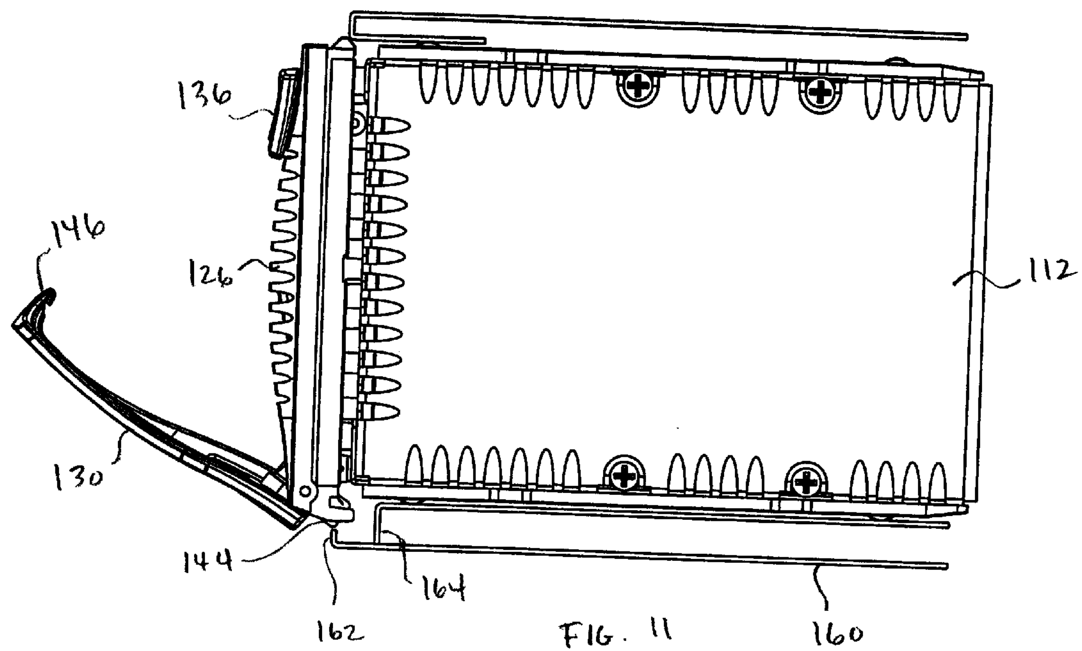
FIGS. 11–12 show top views of an exemplary storage device assembly mounted in a device bay in accordance with embodiments of the present invention.
Figure 12:
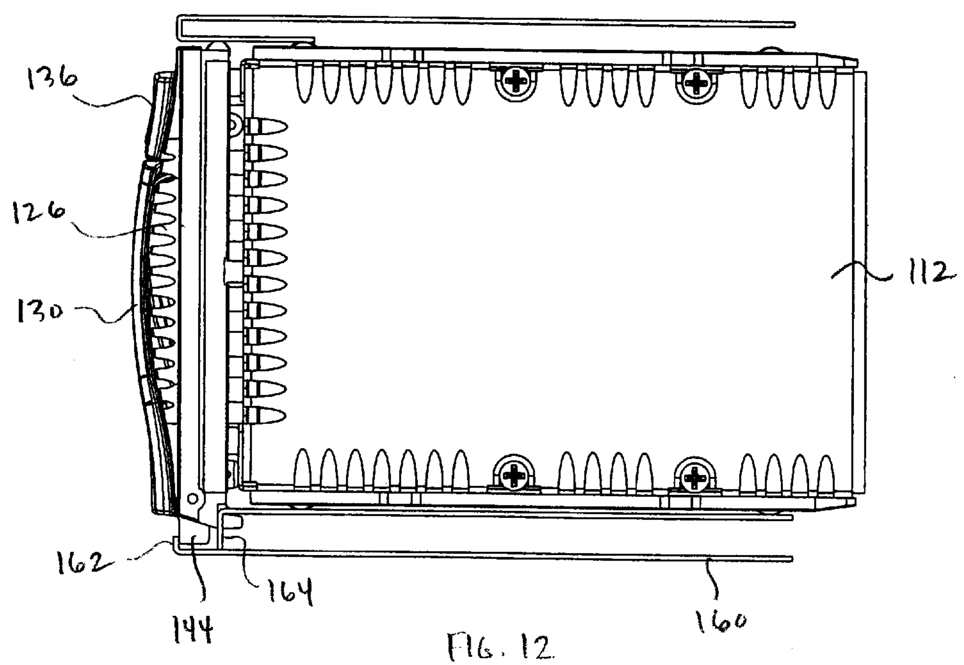

FIGS. 11 and 12 illustrate the process for mounting a storage device assembly 112 into a device bay 160 (partially shown), in accordance with step 10 in FIG. 10. FIG. 11 shows the carrier assembly 114 partially inserted into a device bay 160 with handle 130 in the open position. FIG. 12 shows the carrier assembly 114 fully mounted into the device bay 160 with handle 130 in the closed position. With the storage device assembly 112 in the position as shown in FIG. 11, as the handle 130 is rotated from the open position into the closed position, cam portion 144 abuts a lip member 162 of the device bay 160. As the handle 130 continues to rotate with the cam portion 144 in contact with the lip member 162, the storage device assembly 112 is urged further into the device bay 160. Finally, when the handle 130 reaches the fully closed position, as shown in FIG. 12, the flange 146 mates with the latching mechanism 136 to securely maintain the handle 130 in this position. With the handle 130 closed, the lip member 162 abuts the cam portion 144 to inhibit the removal of the storage device assembly 112 from the device bay 160.

The storage device assembly 112 is removed by actuating the latching mechanism 136 to release the handle 130 from the closed position. Then, as the handle 130 is rotated from the closed to the open position, the opposite side of the cam portion 144 contacts a shoulder portion 164 of the device bay 160. As the handle 130 is rotated further, this contact urges the storage device assembly 112 out of the device bay 160.

Figure 13:
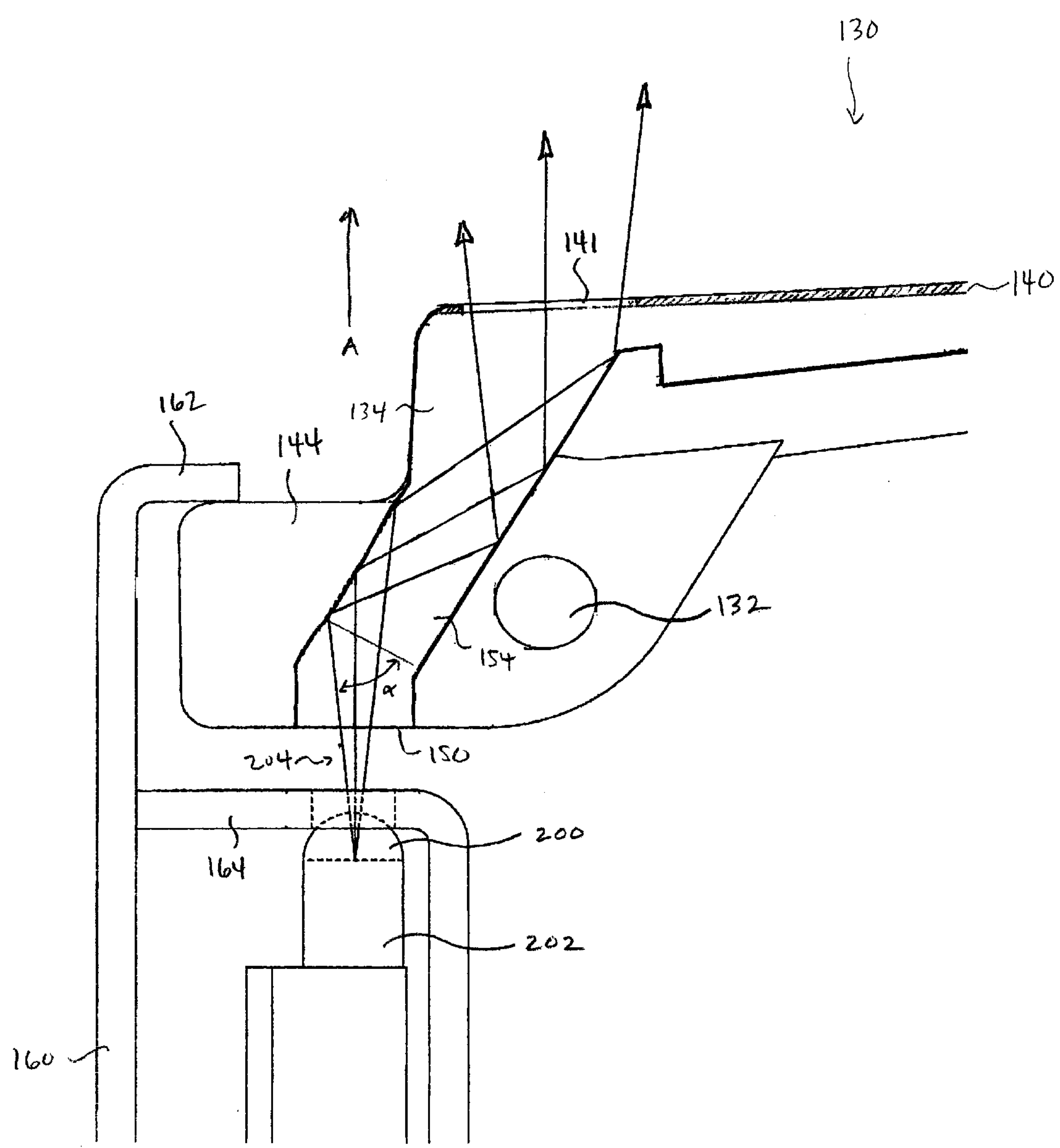
FIG. 13 shows an enlarged view of light signals passing through an exemplary light conduit in accordance with embodiments of the present invention.

FIG. 13 shows a magnified view of the cam portion 144 mating with the device bay 160. Also shown in FIG. 13 is a light source 200, which emits light signals 204 in response to I/O operations performed on the storage device 116 in step 11 of FIG. 10. The light signal 204 emitted in step 12 indicate a status of operation for the storage device 116. The light signals 204 may indicate, for example, that the storage device 116 is receiving power, that I/O activity is being performed, or that an error has occurred. The light source 200 may, for example, be a light-emitting diode ("LED") or some other electronically-generated light source. Alternatively, the light source 200 may be the end of a cylindrical light pipe 202 which transmits light signals generated by an originating light source elsewhere on the device bay 160. The light pipe 202 may be formed in any shape (e.g., cylindrical, rectangular, or hexagonal cross-section) and of any material having some light-transmitting properties (e.g., molded polycarbonate, other polymer, or glass).

The light conduit 134 includes a reflecting middle portion which enables the light signals 204 to be directed along a non-linear path from first end 150 to second end 141. In other words, a first axis A can be formed through the center of the first end 150 in a direction parallel to the first and second lateral sides of the storage device 116, as shown in FIG. 13. The light signals 204 are emitted from the light source 200, are received by the first end 150, reflected off the walls of the reflecting middle portion of light channels 154, and emerge from the second end 141 such that the second end 141 is not intersected by the first axis A. In some embodiments, the angle of incidence $\alpha$ at which the light signals 204 strike the surface of the reflecting middle portion is maintained at an angle sufficient to achieve total or near total internal reflection of the light signals 204 passing through the light conduit 134. When the reflecting middle portion is made of polycarbonate, an angle of incidence $\alpha$ of greater than or equal to 39° may be used.

The above-described design for the light conduit 134 enables the storage device assembly 112 to be utilized in conjunction with numerous variations in light source configurations. In particular, light signals transmitted from a light source 200 located laterally adjacent to the storage device 116 can be transmitted through the light conduit 134 and emitted from a location on the carrier assembly 114 directly in front of the storage device 116. As a result, the cam portion 144 can be used to assist with the insertion of the storage device assembly 112 while not obscuring the light signals emitted from a light source 200 located directly behind the cam portion 144. In addition, the light source 200 can be located within a shoulder portion 164 of the device bay 160, while the first end 150 of the light conduit 150 is located within the cam portion 144 (as shown in FIG. 13). In this case, the cam portion 144 can be used for both urging the storage device assembly 112 in and out of the device bay 160 as well as for receiving the light signals from the light source 200.

While the invention has been described in terms of particular embodiments and illustrative figures, those of ordinary skill in the art will recognize that the invention is not limited to the embodiments or figures described. In particular, the operation of the handle 130 and the shape of the light conduit 134 may vary. Therefore, it should be understood that the invention can be practiced with modification and alteration within the spirit and scope of the appended claims. The description is thus to be regarded as illustrative instead of limiting on the invention.

What is claimed is:

1. A carrier assembly for a storage device, comprising:

a frame for mounting the storage device;

a handle rotatably mounted to the frame; and a light conduit in the handle, said light conduit adapted to transmit light signals from a first end of the light conduit to a second end of the light conduit, wherein said light conduit is in a portion of the handle that rotates with respect to the frame.

2. The carrier assembly of claim 1, wherein:

said light conduit includes a plurality of light channels, each light channel enabling a corresponding light signal to be transmitted from the first end of the light conduit to the second end of the light conduit.

3. The carrier assembly of claim 1, further comprising:

a light template overlying the second end of the light conduit, such that said light signals illuminate a graphic provided on said light template.

4. A carrier assembly for a storage device, wherein the carrier assembly is capable of being inserted in a device bay of a data processing system chassis having a cam receiving portion and a light source, comprising:

a frame for mounting the storage device;

a handle rotatably mounted to the frame;

a cam portion included in said handle such that when said carrier assemble is inserted in the device bay of the data processing system chassis and said handle is rotated from a closed position to an open position, said cam portion engages the cam receiving portion on the computer data processing system chassis to urge the carrier assembly out of the device bay; and a light conduit in the handle, said light conduit adapted to transmit light signals from a first end of the light conduit to a second end of the light conduit, and wherein said first end of the light conduit is positioned in the cam portion of the handle to receive light signals emitted from the light source provided at the cam receiving portion of the computer data processing system chassis.

5. The carrier assembly of claim 4, wherein:

when the carrier assembly is inserted in the device bay and the handle is in the closed position, said cam portion is adapted to abut a lip member of the data processing system chassis to inhibit removal of the carrier assembly from the device bay.

6. A carrier assembly for a storage device, comprising:

a frame for mounting the storage device, wherein said frame is adapted to be mounted to the storage device, wherein the storage device has a substantially rectangular shape including a front, a back, a top, a bottom, a first lateral side, and a second lateral side opposite the first lateral side;

a handle rotatably mounted to the frame;

a cam portion included in the handle which extends laterally beyond the first lateral side of the storage device; and a light conduit in the handle, said light conduit adapted to transmit light signals from a first end of the light conduit to a second end of the light conduit, wherein said first end of the light conduit is provided on the cam portion of the handle and is adapted to transmit light signals from a light source positioned laterally adjacent to the first lateral side of the storage device.

7. The carrier assembly of claim 1, wherein:

said frame is adapted to be mounted to a storage device having a substantially rectangular shape including a front, a back, a top, a bottom, a first lateral side, and a second lateral side opposite the first lateral side, and said frame comprises:

a face portion for positioning adjacent the front of the storage device, said handle being rotatably mounted to the face portion a first guide for positioning adjacent the first lateral side of the storage device; and a second guide for positioning adjacent the second lateral side of the storage device.

8. The carrier assembly of claim 7, wherein said face portion comprises:

a front grill including a latching mechanism for maintaining the handle in the closed position, the handle being rotatably mounted to the front grill; and an electromagnetic interference (EMI) shield for reducing EMI emissions from the storage device.

9. A data processing system, comprising:

(a) an enclosure;

(b) at least one device bay in the enclosure, each of the at least one device bays having a light source provided thereon;

(c) at least one storage device assembly, each storage device assembly being removably mounted in one of the at least one device bays and comprising:

(i) a storage device; and (ii) a carrier assembly mounted to the storage device, said carrier assembly comprising:

(A) a frame for mounting to the storage device;

(B) a handle rotatably mounted to the frame; and (C) a light conduit in the handle, said light conduit adapted to transmit light signals from the light source from a first end of the light conduit to a second end of the light conduit, wherein said light conduit is in a portion of the handle that rotates with respect to the frame.

10. The data processing system of claim 9, wherein for each of said at least one storage device assemblies:

said light conduit includes a plurality of light channels, each light channel enabling a corresponding light signal to be transmitted from the first end of the light conduit to the second end of the light conduit.

11. The data processing system of claim 9, wherein each of said at least one storage device assemblies further comprises:

a light template overlying the second end of the light conduit, such that said light signals illuminate a graphic provided on said light template.

12. A data processing system, comprising:

(a) an enclosure;

(b) at least one device bay in the enclosure, wherein each of the at least one device bays has:

(i) a light source provided thereon; and (ii) a cam engaging portion, the light source being provided at the cam engaging portion; and (c) at least one storage device assembly, each storage device assembly being removably mounted in one of the at least one device bays and comprising:

(ii) a storage device; and (ii) a carrier assembly mounted to the storage device, said carrier assembly comprising:

(A) a frame for mounting to the storage device;

(B) a handle rotatably mounted to the frame;

(C) a cam portion included in the handle, such that when said storage device assembly is inserted in one of the at least one device bays and said handle is rotated from a closed position to an open position, said cam portion engages the cam engaging portion of the device bay to urge the storage device assembly out of the device bay; and (D) a light conduit in the handle, said light conduit adapted to transmit light signals from the light source from a first end of the light conduit to a second end of the light conduit, wherein said first end of the light conduit is positioned in the cam portion of the handle to receive light signals emitted from the light source provided at the cam engaging portion.

13. The data processing assembly of claim 12, wherein:

each of said at least one device bays includes a lip member; and for each of said at least one storage device assemblies, when the carrier assembly is inserted in the device bay and the handle is in the closed position, said cam portion is adapted to abut the lip member to inhibit removal of the carrier assembly from the device bay.

14. A data processing system, comprising:

(a) an enclosure;

(b) at least one device bay in the enclosure, each of the at least one device bays having a light source provided thereon;

(c) at least one storage device assembly, each storage device assembly being removably mounted in one of the at least one device bays and comprising:

(i) a storage device having a substantially rectangular shape including a front, a back, a top, a bottom, a first lateral side, and a second lateral side opposite the first lateral side;

(ii) a carrier assembly mounted to the storage device, said carrier assembly comprising:

(A) a frame for mounting to the storage device;

(B) a handle rotatably mounted to the frame;

(C) a cam portion included in the handle, which extends laterally beyond the first lateral side of the storage device; and (D) a light conduit in the handle, said light conduit adapted to transmit light signals from the light source from a first end of the light conduit to a second end of the light conduit, wherein said first end of the light conduit is provided on the cam portion of the handle and is adapted to transmit light signals from a light source positioned laterally adjacent to the first lateral side of the storage device.

15. The data processing system of claim 9, wherein for each of said at least one storage device assemblies:

said storage device has a substantially rectangular shape including a front, a back, a top, a bottom, a first lateral side, and a second lateral side opposite the first lateral side; and said frame comprises:

a face portion for positioning adjacent the front of the storage device, said handle being rotatably mounted to the face portion;

a first guide for positioning adjacent the first lateral side of the storage device; and a second guide for positioning adjacent the second lateral side of the storage device.

16. The data processing system of claim 15, wherein for each of said at least one storage device assemblies said face portion comprises:

a front grill including a latching mechanism for maintaining the handle in the closed position, the handle being rotatably mounted to the front grill; and an electromagnetic interference (EMI) shield for reducing EMI emissions from the storage device.

17. The data processing system of claim 9, wherein:

said storage device has a substantially rectangular shape including a front, a back, a top, a bottom, a first lateral side, and a second lateral side opposite the first lateral side; and each of said at least one device bays further includes:

a light pipe positioned substantially parallel to the first lateral side of the storage device, said light pipe having a first end and a distal second end, said second end of the light pipe being the light source transmitting light signals to the first end of the light conduit; and a light emitting device provided adjacent the first end of the light pipe, said light emitting device transmitting light signals through the light pipe to the light conduit in the storage device assembly.

18. The data processing system of claim 9, wherein the storage device is a hard disk drive.

19. A method of operating a data processing system, comprising:

mounting a storage device assembly into a storage device bay in a data processing system chassis, said storage device assembly including a storage device, a frame attached to the storage device, a handle rotatably mounted to the frame, and a light conduit provided on the handle, wherein the light conduit is in a portion of the handle that rotates with respect to the frame;

performing input/output (I/O) operations on the storage device provided in the storage device assembly;

emitting a light signal from the device bay, said light signal indicating a status of operation for the storage device;

receiving the light signal at a first end of the light conduit; and transmitting the light signal from a first end of the light conduit to a second end of the light conduit.

20. The method of claim 19, wherein:

said emitting the light signal comprises emitting a plurality of light signals, each light signal indicating a different status of operation for the storage device; and said light conduit includes a plurality of light channels, each light channel transmitting one of the plurality of light signals from the first end of the light conduit to the second end of the light conduit.

21. The method of claim 19, further comprising:

illuminating a graphic provided on a light template overlying the second end of the light conduit.

22. A method of operating a data processing system, comprising:

mounting a storage device assembly into a storage device bay in a data processing system chassis, said storage device assembly including a storage device, a frame attached to the storage device, a handle rotatably mounted to the frame having a cam portion, and a light conduit provided on the handle;

performing input/output (I/O) operations on the storage device provided in the storage device assembly;

emitting a light signal from the device bay, said light signal indicating a status of operation for the storage device;

receiving the light signal at a first end of the light conduit; and transmitting the light signal from a first end of the light conduit to a second end of the light conduit;

rotating the handle from a closed position to an open position, thereby causing the cam portion of the handle to engage a cam engaging portion of the device bay to urge the storage device assembly out of the device bay; and wherein said first end of the light conduit is positioned in the cam portion of the handle to receive light signals emitted from the cam engaging portion of the device bay.

23. The carrier assembly of claim 19, wherein said mounting said storage device assembly into the device bay comprises:

inserting the storage device assembly into the device bay; and rotating the handle from an open position to a closed position, thereby causing a cam portion of the handle to engage a lip member provided in the device bay to inhibit removal of the storage device assembly from the device bay.

24. Method of operating a data processing system, comprising:

mounting a storage device assembly into a storage device bay in a data processing system chassis, said storage device assembly including a storage device, a frame attached to the storage device, a handle rotatably mounted to the frame, and a light conduit provided on the handle, wherein the storage device has a substantially rectangular shape including a front, a back, a top, a bottom, a first lateral side, and a second lateral side opposite the first lateral side, and wherein the handle includes a cam portion which extends laterally beyond the first lateral side of the storage device and the first end of the light conduit is provided in the cam portion of the handle;

performing input/output (I/O) operations on the storage device provided in the storage device assembly;

emitting a light signal from the device bay, said light signal indicating a status of operation for the storage device, wherein said emitting the light signal from the device bay comprises emitting a light signal from a position laterally adjacent to the first lateral side of the storage device;

receiving the light signal at a first end of the light conduit; and transmitting the light signal from a first end of the light conduit to a second end of the light conduit.

25. The method of claim 19, wherein:

the storage device has a substantially rectangular shape including a front, a back, a top, a bottom, a first lateral side, and a second lateral side opposite the first lateral side;

said storage device assembly includes a face portion positioned adjacent the front of the storage device, a first guide positioned adjacent the first lateral side of the storage device, and a second guide positioned adjacent the second lateral side of the storage device; and said mounting the storage device assembly into the storage device bay comprises mating said first guide with a first receiver in the device bay and mating said second guide with a second receiver in the device bay.

26. The method of claim 19, wherein:

said emitting the light signal from the device bay comprises emitting the light signal from a light emitting device provided in the device bay, transmitting the light signal through a light pipe positioned substantially parallel to the first lateral side of the storage device to the first end of the light conduit in the storage device assembly.

* * * * *